(12) United States Patent
Garba et al.

(10) Patent No.: US 12,045,338 B2
(45) Date of Patent: Jul. 23, 2024

(54) METHOD TO SECURE A SOFTWARE CODE

(71) Applicant: THALES DIS CPL USA, Inc., Belcamp, MD (US)

(72) Inventors: Peter Garba, Belcamp, MD (US); Roman Rohleder, Belcamp, MD (US)

(73) Assignee: THALES DIS CPL USA, INC., Austin, TX (US)

( * ) Notice: Subject to any disclaimer, the term of this patent is extended or adjusted under 35 U.S.C. 154(b) by 326 days.

(21) Appl. No.: 17/602,022

(22) PCT Filed: Apr. 8, 2020

(86) PCT No.: PCT/US2020/027201
§ 371 (c)(1),
(2) Date: Oct. 7, 2021

(87) PCT Pub. No.: WO2020/210306
PCT Pub. Date: Oct. 15, 2020

(65) Prior Publication Data
US 2022/0156365 A1 May 19, 2022

(30) Foreign Application Priority Data
Apr. 10, 2019 (EP) .................................... 19168527

(51) Int. Cl.
*G06F 21/54* (2013.01)
*G06F 21/55* (2013.01)
*G06F 21/56* (2013.01)

(52) U.S. Cl.
CPC ............ *G06F 21/54* (2013.01); *G06F 21/554* (2013.01); *G06F 21/566* (2013.01)

(58) Field of Classification Search
CPC ...... G06F 21/54; G06F 21/554; G06F 21/566; G06F 21/6209; G06F 21/72; G06F 21/77;
(Continued)

(56) References Cited

U.S. PATENT DOCUMENTS 8,510,571 B1   8/2013  Chang et al.
2005/0198526 A1*  9/2005  Marr ...................... G06F 21/14
                                                        726/22
(Continued)

FOREIGN PATENT DOCUMENTS

EP          1659515 A1      5/2006

OTHER PUBLICATIONS

International Search Report (PCT/ISA/210) and Written Opinion (PCT/ISA/237) mailed on Jun. 25, 2020, by the European Patent Office as the International Searching Authority for International Application No. PCT/US2020/027201 (WO2020/210306)—[7 pages].

*Primary Examiner* — Henry Tsang

(57) ABSTRACT

Provided is a method of securing a software code of an application including at least one constant data. The method produces secure software code can then be executed on a processor. The method includes fragmenting current constant data into several valid data chunks of random length, encoding and storing the valid data chunks at random locations in the application software code, identifying all occurrences of the current constant data in the application software code and replacing each of them with a call to a Runtime application self-protection (RASP) agent for reading the current constant data, and inserting, at random locations of a control flow graph of the application software code, RASP check instructions which when executed at runtime. The RASP agent being configured for running in the application runtime environment and being capable of controlling application execution and detecting and preventing real-time attacks.

7 Claims, 2 Drawing Sheets

(58) Field of Classification Search
CPC ............. G06F 21/52; G06F 2221/2107; G06F 2221/2127
See application file for complete search history.

(56) References Cited

U.S. PATENT DOCUMENTS

| | | | |
|---|---|---|---|
| 2010/0115287 A1* | 5/2010 | Betouin | G06F 8/434 713/189 |
| 2013/0138973 A1* | 5/2013 | Farrugia | H04L 9/3013 713/190 |
| 2015/0310193 A1* | 10/2015 | Hoogerbrugge | G06F 21/14 726/26 |
| 2016/0117155 A1* | 4/2016 | Salmon-Legagneur | G06F 21/14 717/156 |

* cited by examiner

METHOD TO SECURE A SOFTWARE CODE

FIELD OF THE INVENTION

The present invention relates to the field of software protection, and more particularly of techniques against code static and dynamic analysis.

BACKGROUND OF THE INVENTION

Today, many services are provided to users by running software applications. Such applications may run on various devices, mobile or not, such as desktop computers, laptops, point of sale terminals, smartphones, etc. They may run locally or be implemented across a network like a LAN or the Internet. Some devices such as smart cards or bank credit cards may even be dedicated to running one or a few applications. Such applications are usually run in unsecured environments where an attacker may gain some control, or even full control, of the operation of the system running the application. Consequently, most of these applications need to implement some security mechanisms in order to protect data handled by the application from being read or modified by such an attacker.

An attacker may try to understand the operation of a software by performing a static analysis of the compiled code executed by the system. In addition, he may also use a debugger to perform some dynamic analysis of the code, which enables to read the content of the system's memory while executing the code. As a result of both analysis, the attacker can gain knowledge of sensitive information handled by the software.

Countermeasures have been developed against such types of analysis. For example, code obfuscation may be used in order to make the code almost impossible to read for a human being, making very difficult to find sensitive information in the code. As another example, Runtime Application Self Protection (RASP) has been developed, which is able to protect the code against dynamic analysis by detecting the debugger used by the attacker.

A problem is that each countermeasure is effective only against one type of analysis and has a cost both in terms of code size and execution time. Adding up different countermeasures against different types of analysis may be very costly.

As a result, there is a need for a protection method enabling to protect a code both against static and dynamic analysis.

SUMMARY OF THE INVENTION

For this purpose and according to a first aspect, this invention therefore relates to a method of securing a software code of an application including at least one constant data,
said method generating a secure software code and comprising performed by a processor:
for at least one constant data included in the application software code, called current constant data:
fragmenting said current constant data into several valid data chunks of random length,
encoding and storing said valid data chunks at random locations in the application software code,
identifying all occurrences of the current constant data in the application software code and replacing each of them with a call to a Runtime application self-protection (RASP) agent for reading the current constant data, said RASP agent being configured for running in the application runtime environment and being capable of controlling application execution and detecting and preventing real-time attacks,
inserting, at random locations of a control flow graph of the application software code, Runtime Application Self-Protection (RASP) check instructions which when executed at runtime:
compute RASP check values,
notify the RASP agent with the computed RASP check values, such that, at runtime, in response to each call to the RASP agent for reading the current constant data:
the RASP agent retrieves, all data chunks,
when no RASP check is violated, the RASP agent decodes and combines all the valid data chunks and returns said current constant data,
and when at least one RASP check is violated, the RASP agent returns a dummy constant data.

By doing so, the valid constant data is hidden in the software code, under an encoded and fragmented format, and security checks are performed before recomputing the current data each time it is needed by any operation of the software code, in order to make sure that the execution device is not under attack.

The method according to the first aspect may comprise a step of encoding and storing dummy data chunks at random locations in the application software code, and when at least one RASP check is violated, the dummy constant data may be obtained by the RASP agent by decoding and combining valid and dummy data chunks.

By doing so, it is harder for an attacker to recompute the constant data by himself and the operations performed by the execution device when a constant data is needed remain almost the same whatever the results of the RASP checks, making it harder for an attacker to determine if the values he gets is a genuine constant data or a dummy value.

According to a second aspect, this invention relates to a method of executing, by a processor, instructions of a secure software code of an application,
wherein said secure software code is a modified version of a software code of said application comprising at least one constant data obtained by performing the method according to the first aspect,
wherein the control flow graph of the secure software code comprises Runtime Application Self-Protection (RASP) checks,
said method of executing comprising:
computing RASP check values,
notifying the RASP agent with the computed RASP check values,
retrieving, decoding and combining, by the RASP agent, all data chunks to obtain and return a constant data.

According to a third aspect, this invention relates to a computer program product directly loadable into the memory of at least one computer, comprising software code instructions for performing the steps of the method according to the first aspect when said product is run on the computer.

According to a fourth aspect, this invention relates to a securing device configured for securing a software code of an application including at least one constant data and comprising a processor, a memory and an input-output interface configured for performing the steps of the method according to the first aspect.

According to a fifth aspect, this invention relates to a non-transitory machine-readable storage medium encoded with instructions of a secure software code for execution by a processor, wherein said secure software code is a modified version of a software code of said application comprising at least one constant data obtained by performing the method according to the first aspect.

Such a method, computer program product, securing device and non-transitory machine-readable storage medium according to the second, third, fourth and fifth aspect show the same advantages as the ones of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at securing an application software code SC including at least one constant data. Such a constant data to be protected may for example be a cryptographic key or sensitive data such as a bank account number. Such a constant data may be protected according to the invention by hiding the value of the constant data in the code and by replacing each occurrence of the constant data in the code by instructions performing security checks before returning the value of the constant data.

The invention produces a secure software code SSC such that it would be hard for an attacker analyzing the secure software code with a code analyzer or a debugger to get the value of the protected constant data.

A first aspect of the invention is a method for securing a software code SC before its execution. Such a securing method is performed by a securing device 10 treating the software code SC comprising computer code instructions and producing the secure software code SSC. The obtained secure software code SSC can then be securely executed by an execution device 20.

Figure 1:
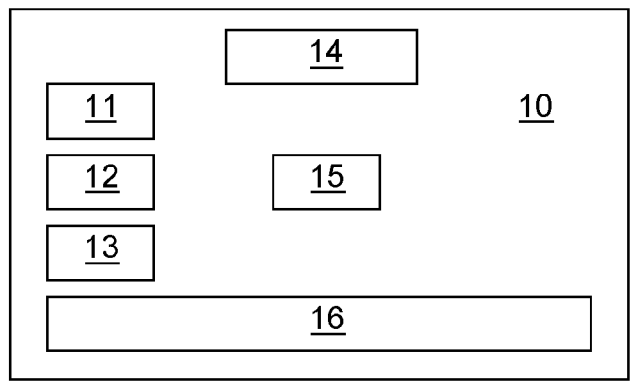
FIG. 1 illustrates schematically a securing device according to an embodiment of the present invention.

Such a securing device 10 may be any electronic device including a processor. For example it may be a personal computer PC on which a development environment was installed. FIG. 1 describes an exemplary embodiment of such a securing device comprising a first processor 11, a first RAM memory 12, a first communication unit 13 such as an Ethernet or Wifi network adapter, a first display 14, first mass storage means 15 such as a hard drive, and first user input means 16. The software code SC to be secured may be stored on the first mass storage means 15 of the securing device. The secure software code SSC, obtained after the securing device 10 applies the method according to the first aspect to the software code SC, can also be stored on the first mass storage 15.

Figure 2:
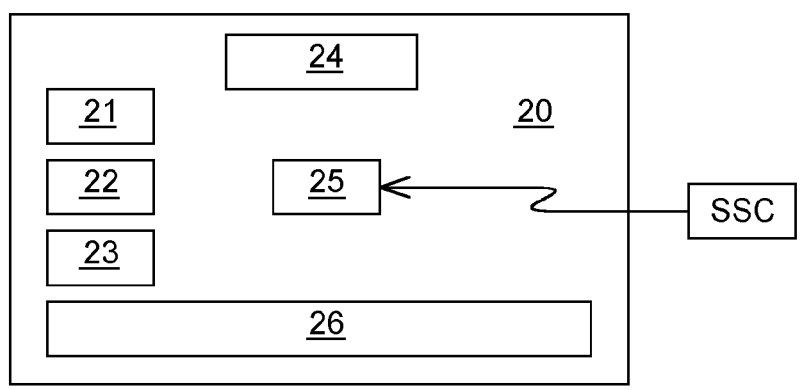
FIG. 2 illustrates schematically an execution device according to an embodiment of the present invention.

FIG. 2 describes an exemplary embodiment of the execution device 20. For example it may be a personal computer PC, a mobile device such as a smartphone or a tablet, or a public terminal in a bank or a point of sale. It may also be a simple chip included in a smart card or a credit card. It may comprise a second processor 21, a second RAM memory 22, a second communication unit 23 such as an Ethernet or Wifi network adapter, a second display 24, second mass storage means 25 such as a hard drive, and second user input means 26. The secure software code SSC, to be executed by the second processor 21 of the execution device 20, may be stored on the second mass storage means 25 of the executing device. The electronic device 20 may be of any type similar or different than the one of the execution device. Both devices may share the same hardware architecture, such as x86 or ARM, or have different architectures.

Securing Method Steps

Figure 3:
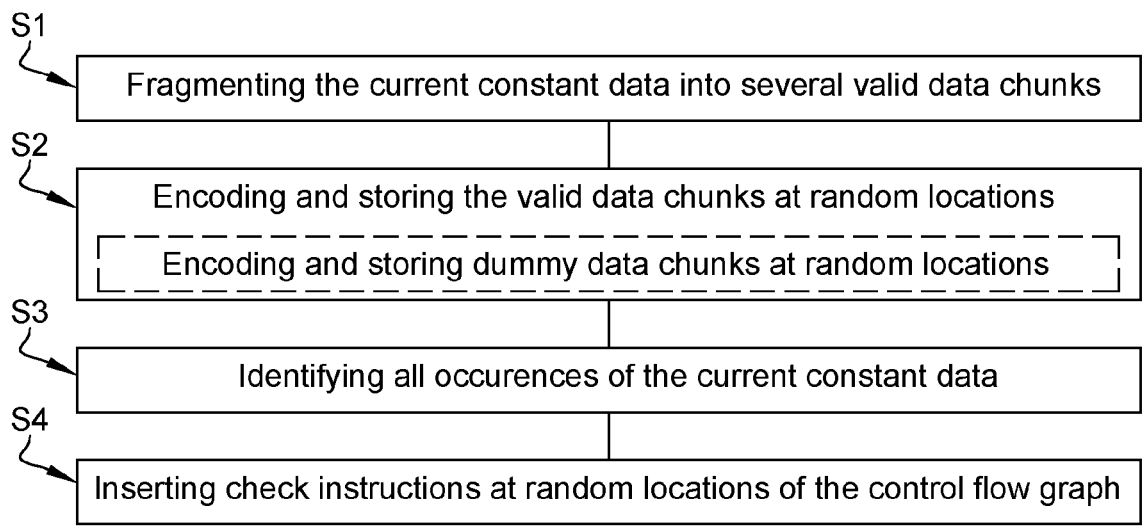
FIG. 3 illustrates schematically a method of securing a software code according to an embodiment of the present invention.
Figure 4:
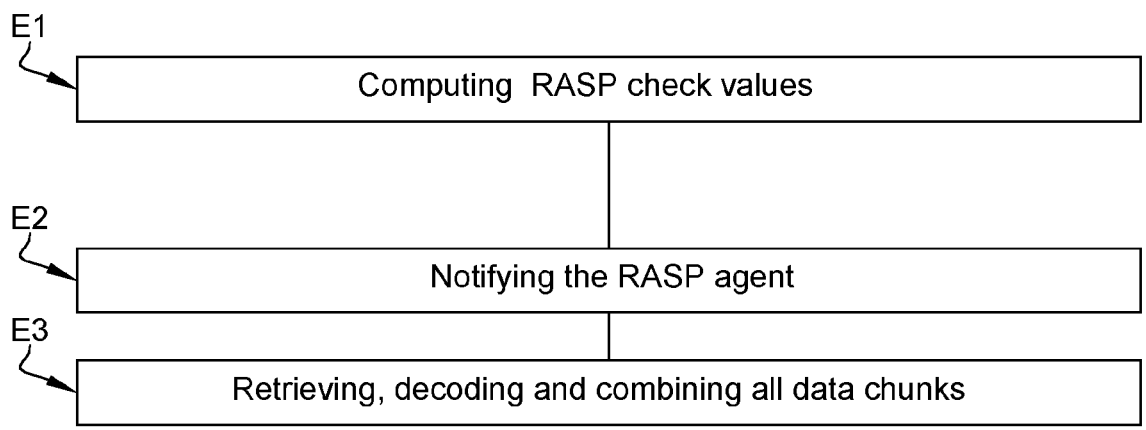
FIG. 4 illustrates schematically a method of executing instructions of a secure software code according to an embodiment of the present invention.

The following paragraphs describe the steps of the method according to the first aspect of the invention, securing the software code SC and producing the secure software code SSC, as depicted on FIG. 3. These securing steps are performed by the first processor 11 of the securing device 10 and are all labeled with the letter "S" followed by the number of the step. Such steps are performed for at least one constant data included in the application software code, called current constant data. If the software code comprises several constant data to be protected, these steps may be repeated for each constant data to be protected.

When needed, reference is made to steps performed by the execution device 20 when executing the secure software code SSC, after the method according to the first aspect is completed. Such execution steps are labeled with the letter "E" followed by the number of the step.

In a first securing step S1, the first processor fragments said current constant data into several valid data chunks of random length.

Then, in a second securing step S2, the first processor encodes and stores said valid data chunks at random locations in the application software code.

By doing so, a copy of the current constant data to be protected is hidden in the software code in a format making it hard for an attacker to retrieve the current constant data. In order to recompute the constant data, one has to know which parts of the code, corresponding to the valid data chunks, should be combined and how to decode them.

The method according to the invention may be used with any type of constant data, included in the code under any format. If needed, the data to be protected may be converted into a preferred format, such as a string or byte array before performing the first securing step S1.

In a third securing step S3, the first processor identifies all the occurrences of the current constant data in the application software code and replaces each of them with a call to a Runtime application self-protection (RASP) agent for reading the current constant data.

When the application is executed by the execution device, the RASP agent is configured for running in the application runtime environment and is capable of controlling the execution of the application and of detecting and preventing real-time attacks. By having access to the whole application runtime environment, the RASP engine is indeed able to determine if a debugger is running, if the execution device has been tampered with, to check the identity of the execution device . . . .

In order to perform such a detection of a possible attack, RASP check instructions are inserted, during a fourth securing step S4, by the first processor, at random locations of the control flow graph of the application software code.

When the application is executed by the execution device, during a first execution step E1, these RASP check instructions compute RASP check values, indicative of the result of a check such as: is a debugger being used? what is the execution device ID? has the execution device been tampered with or jailbroken? Then, during a second execution step E2, these RASP check values are notified to the RASP agent, enabling it to determine if the execution device is in a safe state or if it is being attacked.

The calls to the RASP agent inserted in the code instead of each occurrence of the current constant data are such that at runtime, during a third execution step E3, in response to each call to the RASP agent for reading the current constant data:
  the RASP agent retrieves, all data chunks,
  when no RASP check is violated, the RASP agent decodes and combines all the valid data chunks and returns said current constant data,
  and when at least one RASP check is violated, the RASP agent returns a dummy constant data.

During the second securing step S2, the first processor may also encode and store dummy data chunks at random locations in the application software code. By doing so, the valid data chunks corresponding to a valid constant data are intertwined in the secure software code with dummy data chunks, making it harder for an attacker to determine which data chunks shall be combined for retrieving the constant data. In such a case, during the third execution step E3, when at least one RASP check is violated, the dummy constant data to be returned by the RASP agent is obtained by the RASP agent by decoding and combining valid and dummy data chunks.

Secure Software Code Execution

After the steps described here above have been performed by the securing device, producing a secure software code, such a secure software code can be securely executed by the second processor 21 of the execution device 20:
  during a first execution step E1, the second processor 21 computes RASP check values.
  during a second execution step E2, the second processor 21 notifies the RASP agent with the computed RASP check values.
  during a third execution step E3, the RSAP agent executed by the second processor 21 retrieves, decodes and combines all the data chunks to obtain and return a constant data Other Aspects In a second aspect, the invention also relates to the method of executing the instructions of the secure software code, as executed by the second processor 21 of the executing device 20. Said secure software code is then a modified version of the software code of said application comprising at least one constant data on which the method according to the first aspect described here above has been applied. The method of executing the instructions of the secure software code comprises the execution steps E1 to E3 described here above:
  computing RASP check values,
  notifying the RASP agent with the computed RASP check values,
  retrieving, decoding and combining, by the RASP agent, all data chunks to obtain and return a constant data.

In a third aspect, the invention also relates to a computer program product directly loadable into the memory of at least one computer, comprising software code instructions for performing the steps of the method according to the first aspect when said product is run on the computer.

In a fourth aspect, the invention also relates to a non-transitory machine-readable storage medium encoded with the instructions of the secure software code obtained after the first processor 11 of the securing device 10 has performed at least the steps S1 to S4 of the method according to the first aspect described here above. Said secure software code is then a modified version of the unsecure software code on which said method according to the first aspect has been applied.

As a result, the proposed methods enable to protect constant data in the software code both against static analysis and against dynamic analysis.

The invention claimed is:

1. A method of securing a software code of an application including at least one constant data,
  said method generating a secure software code and comprising:
  for at least one constant data included in an application software code, called a current constant data:
    fragmenting said current constant data into several valid data chunks of random length;
    encoding and storing said valid data chunks at random locations in the application software code;
    identifying all occurrences of the current constant data in the application software code; and
    replacing each of them with a call to a Runtime Application Self-Protection (RASP) agent for reading the current constant data, said RASP agent being configured for running in an application runtime environment and being capable of controlling application execution and detecting and preventing real-time attacks,
  inserting Runtime Application Self-Protection (RASP) check instructions at random locations of a control flow graph of the application software code, such that said (RASP) check instructions when executed at runtime
    compute RASP check values and
    notify the RASP agent with the computed RASP check values;
  such that, at runtime, in response to each call to the RASP agent for reading the current constant data:

the RASP agent retrieves all data chunks;
when no RASP check is violated, the RASP agent decodes and combines all the valid data chunks and returns said current constant data; and
when at least one RASP check is violated, the RASP agent returns a dummy constant data.

2. The method of claim 1, comprising a step of encoding and storing dummy data chunks at random locations in the application software code, and wherein when at least one RASP check is violated, the dummy constant data is obtained by the RASP agent by decoding and combining valid and dummy data chunks.

3. A method of executing, by a processor, instructions of a secure software code of an application,
wherein said secure software code is a modified version of a software code of said application comprising at least one constant data called current constant data, and wherein said secure software code was generated by:
fragmenting said current constant data into several valid data chunks of random length; encoding and storing said valid data chunks at random locations in the application software code;
identifying all occurrences of the current constant data in the application software code and replacing each of them with a call to a Runtime Application Self-Protection (RASP) agent for reading the current constant data, said RASP agent being configured for running in an application runtime environment and being capable of controlling application execution and detecting and preventing real-time attacks; and
inserting Runtime Application Self-Protection (RASP) check instructions at random locations of a control flow graph of the application software code, such that said (RASP) check instructions when executed at runtime compute RASP check values;
notify the RASP agent with the computed RASP check values;
and such that, at runtime, in response to each call to the RASP agent for reading the current constant data:
the RASP agent retrieves all data chunks;
when no RASP check is violated, the RASP agent decodes and combines all the valid data chunks and returns said current constant data; and
when at least one RASP check is violated, the RASP agent returns a dummy constant data:
wherein the control flow graph of the secure software code comprises (RASP) checks;
and said method comprises:
computing RASP check values;
notifying the RASP agent with the computed RASP check values;
and retrieving, decoding and combining, by the RASP agent, all valid data chunks to obtain and return a constant data.

4. The method of claim 3, wherein said method steps are performed by a computer program product directly loadable into a memory of at least one computer, comprising software code instructions for performing said method steps when said product is run on the at least one computer.

5. The method of claim 3, wherein said method steps are performed by a securing device configured for securing a software code of an application including at least one constant data and comprising a processor, a memory and an input-output interface.

6. The method of claim 3, wherein said method steps are stored on a non-transitory machine-readable storage medium encoded with instructions of a secure software code for execution by a processor.

7. A secure device, comprising:
an application software code comprising at least one constant data called a current constant data;
a non-transitory machine-readable storage medium encoded with instructions to generate a secure software code from said application software code,
a processor for executing said instructions; and
wherein,
said instructions executed by said processor:
fragment said current constant data into several valid data chunks of random length,
encode and store said valid data chunks at random locations in the application software code;
identify all occurrences of the current constant data in the application software code and replace each of them with a call to a Runtime Application Self-Protection (RASP) agent for reading the current constant data, said RASP agent being configured for running in an application runtime environment and being capable of controlling application execution and detecting and preventing real-time attacks; and
insert Runtime Application Self-Protection (RASP) check instructions at random locations of a control flow graph of the application software code, such that said (RASP) check instructions when executed at runtime
compute RASP check values, and
notify the RASP agent with the computed RASP check values;
such that, at runtime, in response to each call to the RASP agent for reading the current constant data;
the RASP agent retrieves, all said data chunks;
when no RASP check is violated, the RASP agent decodes and combines all the valid data chunks and returns said current constant data; and
when at least one RASP check is violated, the RASP agent returns a dummy constant data.

* * * * *